(12) United States Patent
Trakas

(10) Patent No.: US 7,300,275 B2
(45) Date of Patent: Nov. 27, 2007

(54) MULTI-POINT NOZZLE ASSEMBLY

(76) Inventor: Panos Trakas, 1769 Whispering Ct., Addison, IL (US) 60101

( * ) Notice: Subject to any disclaimer, the term of this patent is extended or adjusted under 35 U.S.C. 154(b) by 268 days.

(21) Appl. No.: 11/259,493

(22) Filed: Oct. 26, 2005

(65) Prior Publication Data

US 2007/0092597 A1    Apr. 26, 2007

(51) Int. Cl.
*B29C 45/22* (2006.01)
(52) U.S. Cl. ....................... 425/549; 425/572
(58) Field of Classification Search ................ 425/549, 425/572
See application file for complete search history.

(56) References Cited

U.S. PATENT DOCUMENTS

| | | |
|---|---|---|
| 4,609,138 A | 9/1986 | Harrison |
| 4,648,546 A | 3/1987 | Gellert |
| 5,147,663 A | 9/1992 | Trakas |
| 5,441,197 A | 8/1995 | Gellert et al. |
| 5,464,343 A | 11/1995 | Hepler |
| 5,587,188 A | 12/1996 | Hepler |
| 5,641,526 A * | 6/1997 | Gellert ........................ 425/572 |
| 5,645,874 A | 7/1997 | Osuna-Diaz |
| 6,095,790 A * | 8/2000 | Gellert et al. ................ 425/572 |
| 6,713,002 B2 * | 3/2004 | Kazmer et al. ............. 425/572 |
| RE38,920 E * | 12/2005 | Gellert ........................ 425/549 |

OTHER PUBLICATIONS

Melt Design Inc. Catalog pp. C.a.1 and C.a.2, Jan. 1995.
Polyshot Corporation, Multitip Runnerless Molding Catalog, Mar. 1992.

* cited by examiner

*Primary Examiner*—Tim Heitbrink
(74) *Attorney, Agent, or Firm*—Cook, Alex, McFarron, Manzo, Cummings & Mehler, Ltd.

(57) ABSTRACT

An injection molding nozzle assembly is disclosed comprising a one-piece central body having a generally-cylindrical first section defining a radial surface and terminating in a face and a generally-cylindrical second section defining a radial surface extending in axial alignment with the first section in a direction opposite to the face. A central passage extends axially within the second section, and one or more flow passages extend between the central passage and the face of the first section. At least one of the flow passages has an aperture in the radial surface of the second section which receives a plug. A nozzle seal is removably secured to each of the flow passages on the face of the first cylindrical section. A flange is provided that has a generally-cylindrical central opening that is to be received by the second cylindrical portion of the body and is affixed to the body so as to overlie each plug.

18 Claims, 6 Drawing Sheets

MULTI-POINT NOZZLE ASSEMBLY

BACKGROUND OF THE INVENTION

Hot runner injection molding systems are being increasingly used because they provide for enhanced flexibility in the design, manufacture and operation of multi-cavity molds. Such systems are self-contained and typically comprise a body having a plurality of externally-heated flow passages and supporting a number of interchangeable or replaceable nozzle seals or tips. Once such system is shown in U.S. Pat. No. 5,464,343. See also, U.S. Pat. No. 5,147,663 having the same inventor as the present application and which shows a multi-tip nozzle in the context of a modular manifold assembly. Specifically, in the '663 patent a plurality of mold plates locate and hold in place a central, primary heated inlet and a plurality of secondary heated members that extend the heated flow path to the mold cavity gates and are interconnected by heated manifold components.

Heretofore, multi-tip nozzles have typically involved time-consuming manufacturing techniques, particularly with regard to the multiple internal flow passages that are required. In addition, the configuration of the flow passages has generally dictated that the multi-point nozzle assemblies have a relatively tall profile. This results in a correspondingly taller stack of mold plates to accommodate the multi-point nozzle assembly, with an accompanying increase in the mass of the entire injection molding system.

Accordingly, it is an object of the present invention to provide a nozzle assembly particularly suited for a multi-point nozzle system that is relatively simpler to manufacture and has a relatively lower profile than prior multi-point nozzle assemblies.

SUMMARY OF THE INVENTION

These objects, as well as others that will become apparent upon reference to the accompanying drawings and following detailed description, are provided by an injection molding nozzle assembly comprising a one-piece central body having a generally-cylindrical first section defining a radial surface and terminating in a face and a generally-cylindrical second section defining a radial surface extending in axial alignment with the first section in a direction opposite to the face. A central passage extends axially within the second section, and one or more flow passages extend between the central passage and the face of the first section. At least one of the flow passages has an aperture in the radial surface of the second section which receives a plug. A nozzle seal is removably secured to each of the flow passages on the face of the first cylindrical section. A flange is provided that has a generally-cylindrical central opening that is to be received by the second cylindrical portion of the body and is affixed to the body so as to overlie each plug.

DETAILED DESCRIPTION OF THE DRAWINGS

As required, a detailed embodiment of the present invention is disclosed herein. However, it is to be understood that the disclosed embodiment is merely exemplary of the invention, which may be embodied in various forms. Therefore, the specific details disclosed here are not to be interpreted as limiting, but merely as a basis for the claims and as a representative basis for teaching one skilled in the art to variously employ the present invention in any appropriate manner.

Figure 1:
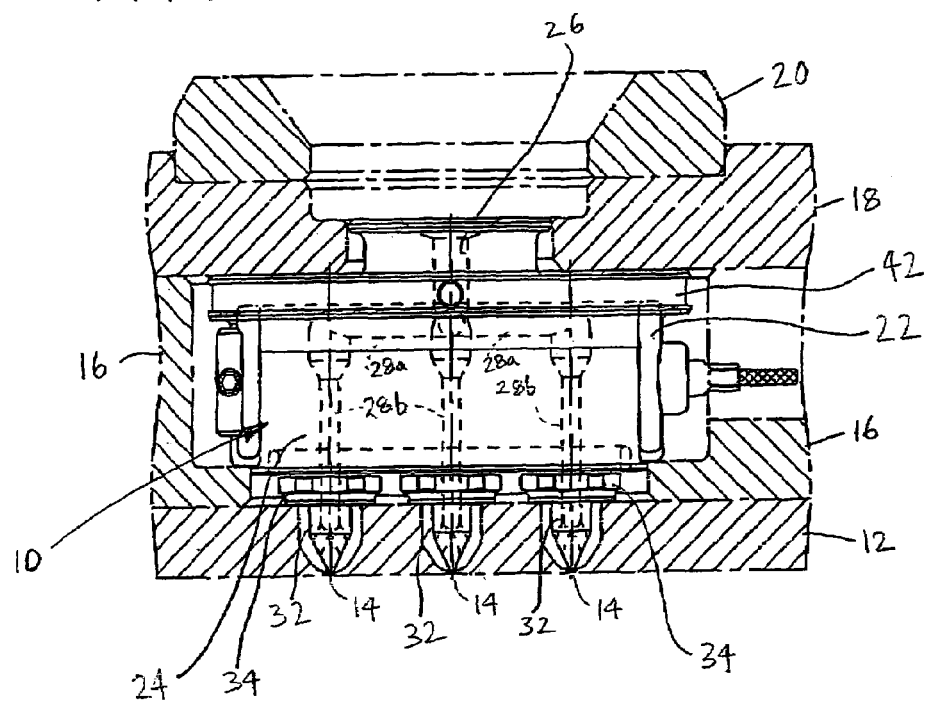
FIG. 1 is a front view of a multi-point nozzle assembly according to the present invention in combination with various mold plates, the latter being shown in cross-section.

Turning to the drawings, a multi-point nozzle assembly, generally designated 10, is shown in FIG. 1 in combination with various mold plates, namely a bottom plate 12 including a plurality of gates 14 leading to various mold cavities (not shown) and forming a face seal with the nozzle assembly 10; an intermediate plate 16 for receiving the nozzle assembly; a top clamp plate 18; and a locating ring 20.

The nozzle assembly 10 includes a plurality of externally-heated flow passages. To this end, the illustrated nozzle assembly 10 includes a band heater 22 that fits around the circumference of the nozzle assembly 10. Alternatively, a separate heater element may be provided that is located internally of the nozzle assembly, such as that disclosed in U.S. Pat. No. 4,988,848 to Trakas, in place of the illustrated external band heater. Other resistance-type heating elements which are well known in the art may also be used. A conventional thermocouple (not shown) is located near the tips of the nozzle assembly 10, as is typical in the art.

Figure 2:
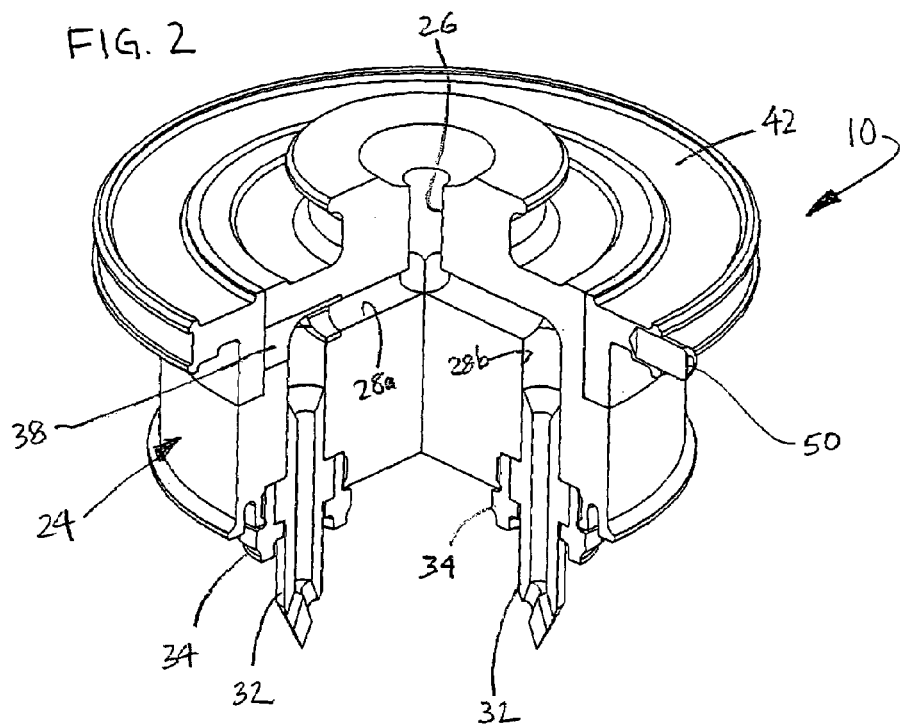
FIG. 2 is a perspective view of the multi-point nozzle assembly of FIG. 1 with a quarter-section broken away to show detail.
Figure 3:
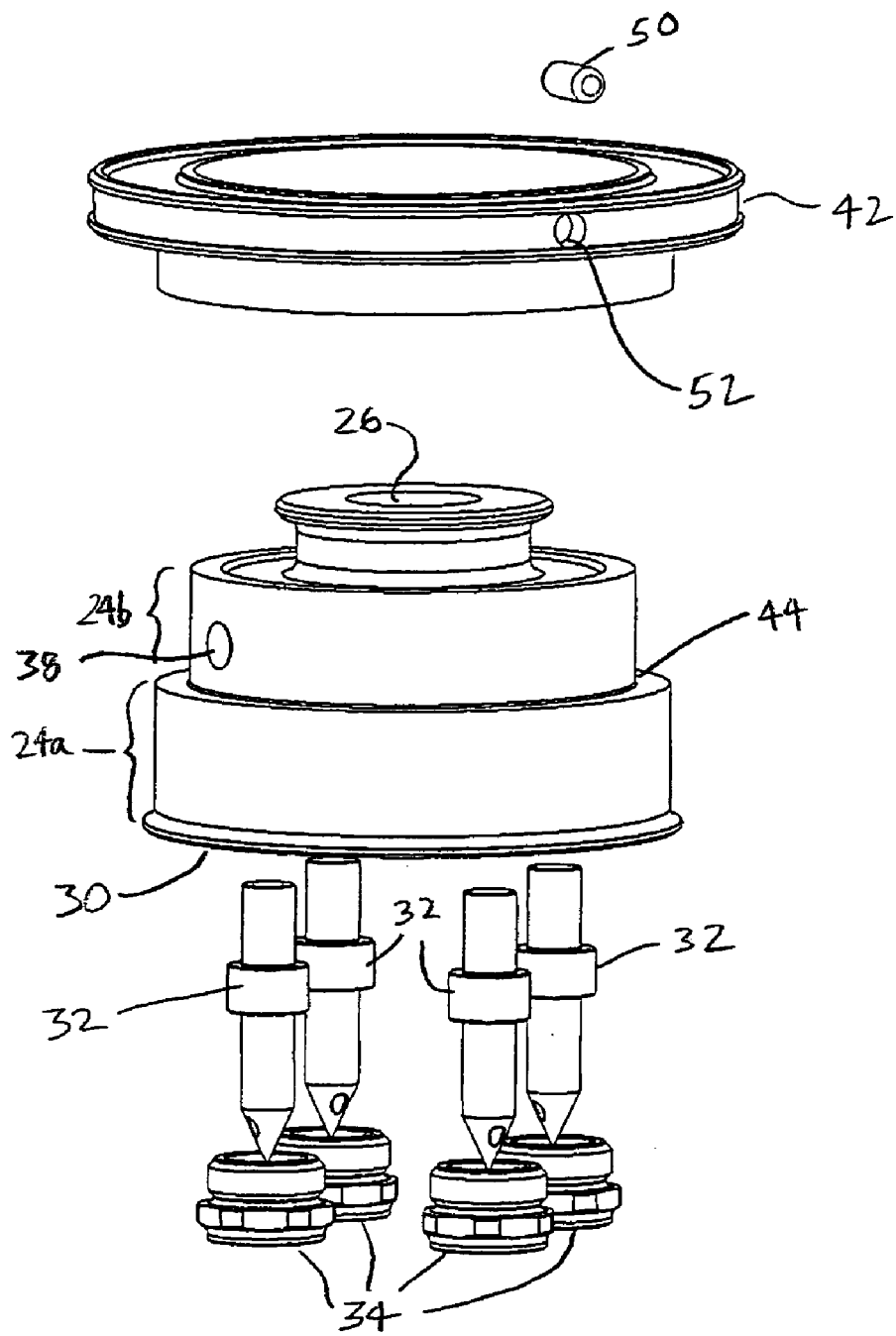
FIG. 3 is an exploded perspective view of the multi-point nozzle assembly according to the present invention.
Figure 4:
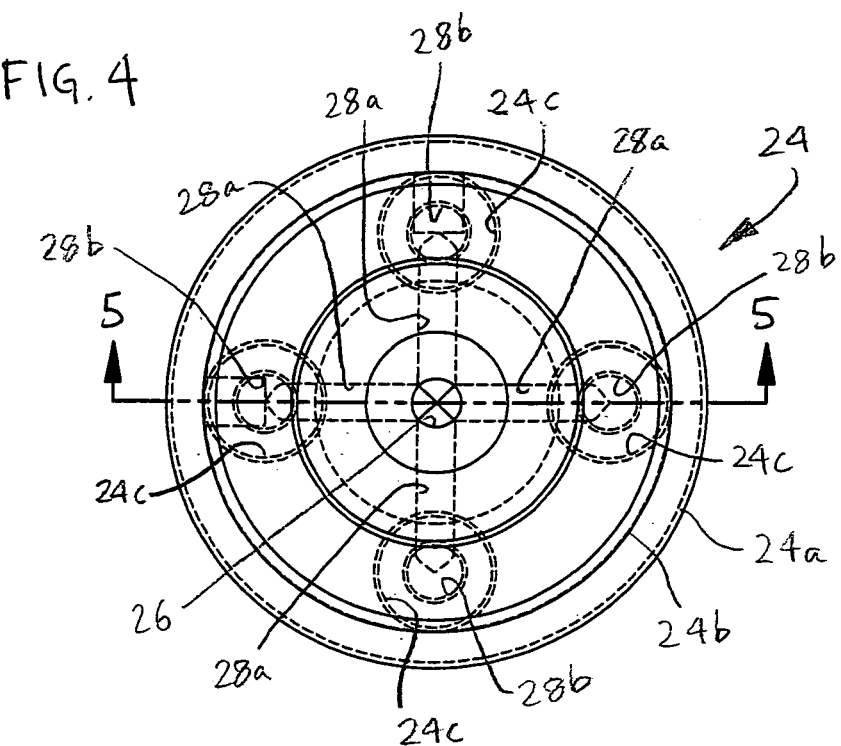
FIG. 4 is a top view of the central body forming a component part of the present invention.

With reference to FIGS. 2 and 3, the basic components of the multi-point nozzle assembly 10 are seen. The assembly comprises a central, one-piece body 24. As shown, the central body 24 has a generally cylindrical configuration, with a first, lower section 24a of a first diameter and a second, upper section 24b of a second diameter, which is preferably smaller than the diameter of section 24a. The central body 24 defines a generally axially-extending central flow passage 26 for receipt of hot melt with a plurality of flow passages, each comprising two branches 28a, 28b that extend from the central flow passage 26 to the face 30 defined by the first section 24a of the central body 24. The flow passages terminate in enlarged, threaded apertures 24c that each receive a gating needle 32 and a nozzle seal 34. As illustrated, four flow passages, and thus four tips or points 32, are shown. However, any number of flow passages could be utilized as may be accommodated by the size of the central body.

As illustrated, the gating needles 32 are removably secured to the central body 24 by separate, externally-threaded nozzles seals 34. The gating needles 32 and nozzle seals 34 are preferably as shown in my co-pending application, Ser. No. 11/036,720, filed Apr. 7, 2005, and may optionally include means for axially adjusting the position of the needle as shown in my co-pending application Ser. No. 10/884,094, filed Jul. 2, 2004, both of which are incorporated by reference hereon. While the gating needles 32 and nozzle seals 34 are shown as separate pieces in the accompanying drawings, they may be integral with each other without departing from the present invention.

In keeping with one aspect of the invention, each flow passage has a first branch 28a that extends generally perpendicular to the axis of the central body in the second section 24b, and a second branch 28b extending between the first branch 28a and the face 30 of the central body. The perpendicularity of the first branches to the central axis helps provide for a nozzle assembly having a low profile. As illustrated, the second branches 28b are disposed perpendicularly to their respective first branches 28a. However, this is not required.

One of the advantages accruing to the present invention is its relative ease of manufacture, particularly in the formation of the flow passages 28 in the central body 24. This is attained by having the first branch 28a of each flow passage preferably made by first drilling from the external radial surface of the second or upper section 24b of the central body to the central flow passage 26. If the nozzle assembly has an even number of gating needles/nozzle seals, the first branches of the flow passage are preferably evenly radially spaced, so that pairs of radially-opposed gating needles/nozzle seals result. In such a case, a pair of radially opposed first passages can be formed by drilling starting from a single entry point on the radial surface of the second section 24b, drilling through the central flow passage 26, and stopping short of the radial surface of the central body opposite to the entry point. The second passages 28b are formed simply by drilling up from the face 30 so as to intersect with the first passage 28a.

Figure 10:
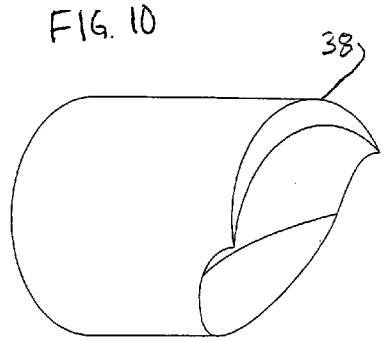
FIG. 10 is a perspective view of a first embodiment of a plug forming part of the present invention.
Figure 11:
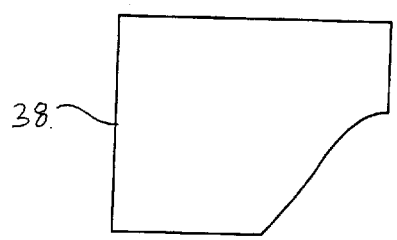
FIG. 11 is a side view of the plug of FIG. 10.

If the branch 28a, when drilled, extends from the outer radial surface of the central body to the central flow passage, an aperture 36 is defined in the radial surface of the second section 24b, and a plug 38 is provided that closes the aperture 36. The plug 38 is press-fitted into the aperture prior to the drilling of the second flow passage 28b. The plug 38, best seen in FIGS. 10 and 11, is preferably cylindrical in configuration and is sized in length to extend from the radial surface of the central body to a location within the radial position where the second passage 28b will intersect with the first passage 28a. Thus, as the second passage 28b is drilled-out, the end of the drill bit will radius the inward end of the plug 38 to provide a smooth transition in the flow passage from the first branch to the second branch.

Figure 12:
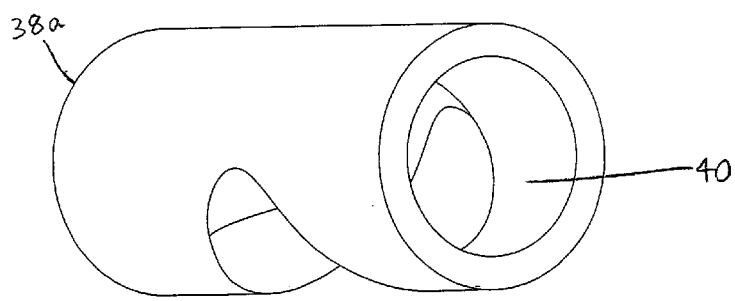
FIG. 12 is a perspective view of a second embodiment of a plug in accordance with the present invention.
Figure 13:
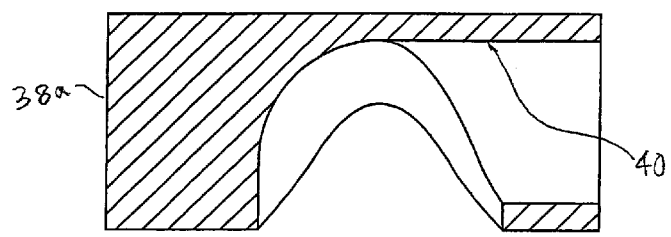
FIG. 13 is a cross-sectional view of the plug of FIG. 12.

An alternative design for the plug 38 is shown in FIGS. 12 and 13. This embodiment, designated 38a, is initially sized in length to extend past the intersection of the first and second branches. The plug 38a is centrally drilled prior to insertion into the aperture 36 so as to have a sleeve-like segment 40 extending partially along the axis thereof. When the second branch is drilled into the central body, communication between the first branch and second branch is established by drilling through the sidewall of the sleeve 40 of the plug 38a.

Figure 5:
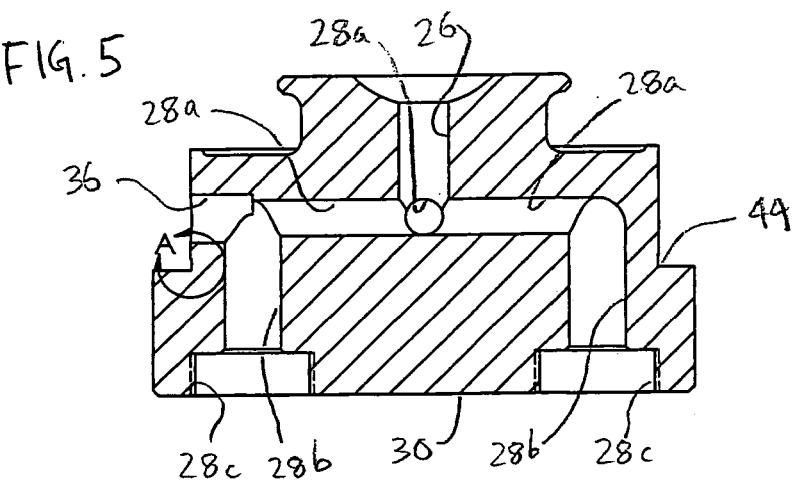
FIG. 5 is a cross-sectional view of the central body taken along line 5-5 of FIG. 4.
Figure 6:
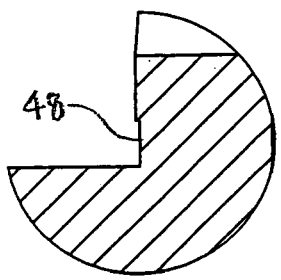
FIG. 6 is an enlarged fragmentary view of Section A taken from FIG. 5.
Figure 7:
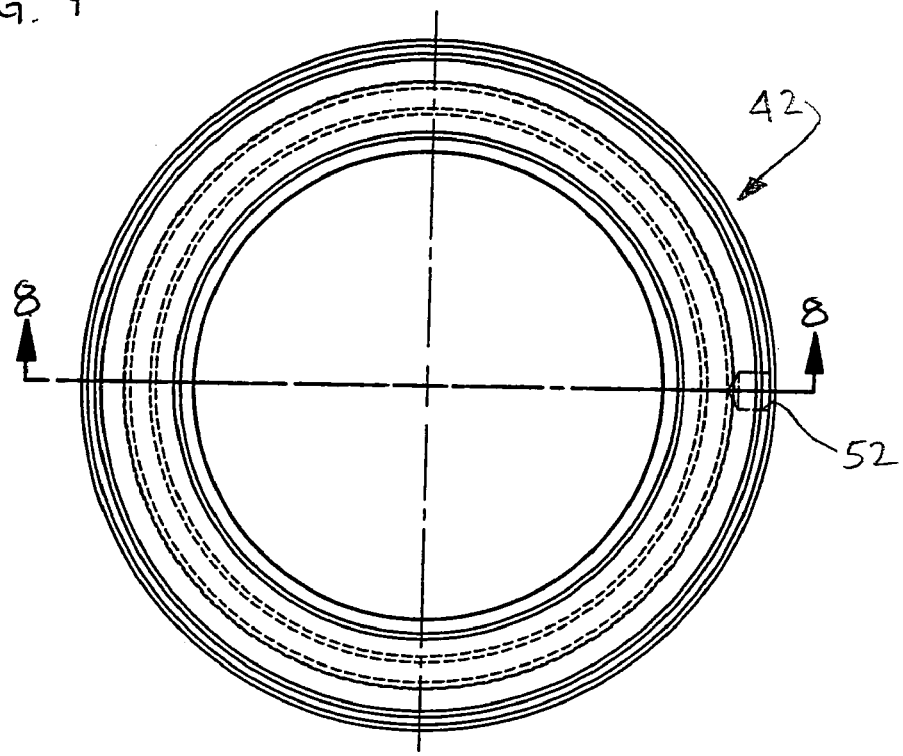
FIG. 7 is a top view of a flange forming a component part of the present invention.
Figure 8:
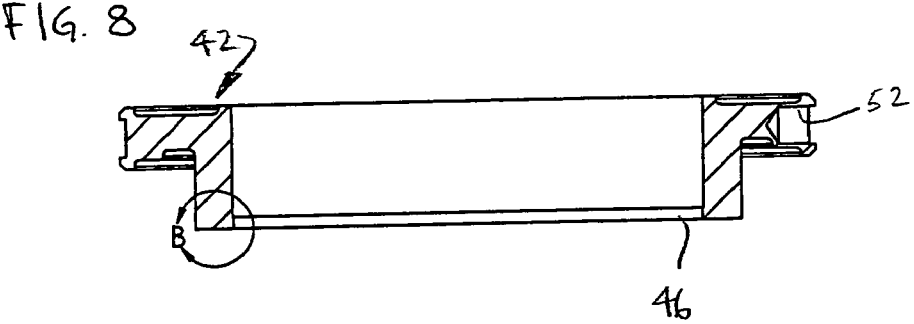
FIG. 8 is a sectional view of the flange taken along line 8-8 of FIG. 7.
Figure 9:
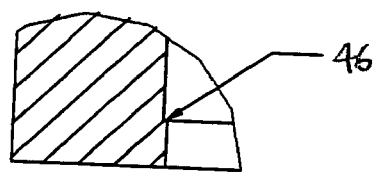
FIG. 9 is an enlarged fragmentary view of Section B taken from FIG. 8.

As can be appreciated, high pressures are exerted on the interior of the central body 24 by the hot melt during the injection molding cycle. Such pressures would, in the normal course, tend to dislodge the plugs 38 or 38a that seal the flow passage 28, thus rendering the nozzle assembly inoperable. Consequently, in accordance with one aspect of the present invention, a separate radial flange 42 is provided that is received on the central body 24 so as to overlie the plugs 38 or 38a that close the apertures 36 created by the drilling of the first branches 28a of the flow passages 28. The flange 42, when received by the central body 24, seats on a shoulder 44 in the central body 24 defined by the difference in the diameter between the lower section 24a and the upper section 24b of the central body 24. When assembling the flange 42 and the central body 24, the flange 42 is preferably heated so that the diameter of its central opening expands to allow it to be received on the central body 24. Then, as the flange 42 cools and contracts, it becomes locked onto the central body 24. An even stronger securment between the flange 42 and the central body 24 can be created by providing the mating radial surfaces with an irregular, complimentary shape that will interlock upon assembly. In the illustrated embodiment, the flange 42 is provided with an inwardly-projecting radial step 46, best seen in FIGS. 8 and 9, that is sized to be received in the complimentarily-shaped radial recess 48 formed in the central body, best seen in FIGS. 5 and 6.

In keeping with another aspect of the invention, means are provided for properly aligning the nozzle assembly 10 with the mold plates. To this end, the nozzle assembly 10 is provided with an alignment pin that extends outwardly therefrom so as to be received in a corresponding alignment slot in the mold plates. With reference to the illustrated embodiment, an alignment pin 50 is provided that is received in an aperture 52 in the radial surface of the flange 42. The alignment pin 52 helps to align the nozzle assembly with respect to the mold plates 42 rotation about a vertical axis, while the outside diameter of the flange is sized with respect to the mold plate to prevent movement of the nozzle assembly in a horizontal plane, thus insuring proper alignment of the gating needles with the gates.

Figure 14:
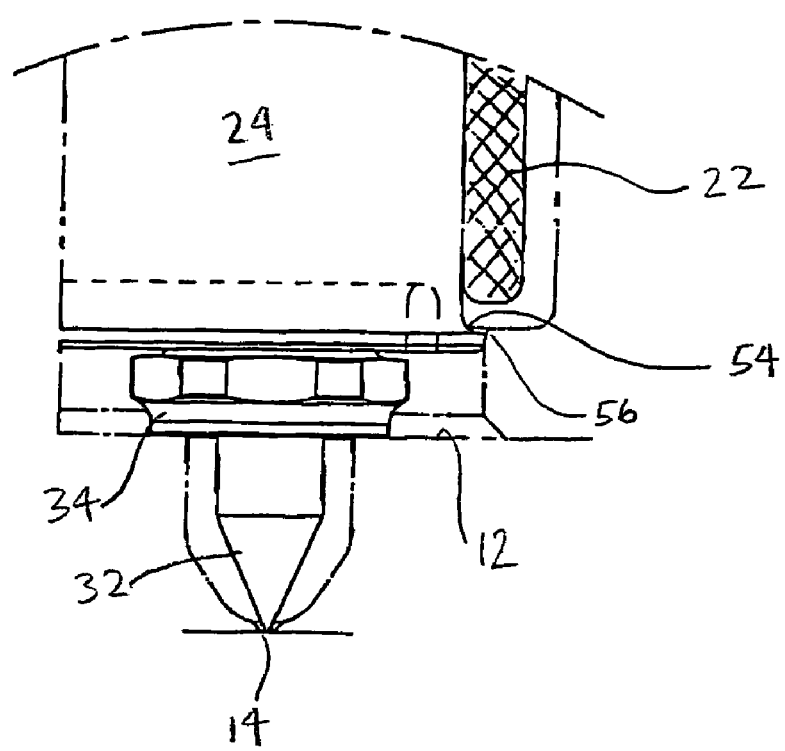
FIG. 14 is an enlarged fragmentary view of a portion of the central body forming a component part of the present invention.

In use, the primary seal to prevent flow of hot melt out of the mold cavity and into the recess for receiving the nozzle assembly 10 is the face seal formed between the nozzle seals 34 and their respective gates. In keeping with another aspect of the invention, the nozzle assembly 10 is provide with a secondary seal to protect against back flow of hot melt in the event that the face seal is ineffective. To this end, the radial surface of the nozzle assembly 10 may be enlarged at a discrete location to provide a secondary seal with the mold plates. With reference to FIG. 14, the lower, first section 24a of the central body 24 has an outwardly flared projection 54 adjacent its face 30. The projection 54 forms a seal with the bore 56 on the intermediate plate 16, thus providing the secondary seal against backflow.

Thus, a multi-point nozzle assembly has been provided that meets all the objects of the present invention. While the invention has been described in terms of certain preferred embodiments, it is not intended to limit the invention to the same. Instead the invention is to find by the scope of the dependent claims.

The invention claimed is:

1. A heated, multi-tip injection molding nozzle comprising:
   one or more removable gating needles;
   a one-piece central body comprising one or more first apertures with each first aperture corresponding to one of the one or more gating needles and being adapted to receive a gating needles therein, a central flow passage, one or more first branches extending radially from the central flow passage, and a second branch depending from each first branch and terminating in one of the first apertures, at least one of the first branches extending through an exterior surface of the body to define a second aperture;

a plug adapted to be received in each second aperture; and a flange having a central opening so as to be received by the body and affixed to the body so as to overlie the plug.

2. The multi-tip nozzle of claim 1 wherein the number of gating needles and first branches is a multiple of two, each pair of first branches being diametrically opposed with respect to the central flow passage, one of each pair of diametrically opposed first branches extending through to the exterior of the body to define the second aperture.

3. The multi-tip nozzle of claim 2 wherein the number of gating needles is four.

4. The multi-tip nozzle of claim 1 wherein each gating needle comprises a threaded portion to removably secure the needle to its associated first aperture in the body.

5. The multi-tip nozzle of claim 1 wherein the body comprises a shoulder, with the flange being seated onto the shoulder.

6. The multi-tip nozzle of claim 5 wherein the central opening of the flange includes a stepped portion that engages the shoulder on the body.

7. The multi-tip nozzle of claim 1 wherein an exterior surface of the flange includes an alignment pin extending outwardly from the exterior surface of the flange.

8. An injection molding nozzle assembly comprising:

a one-piece central body comprising a first section of a first diameter defining a radial surface and terminating in a face, a second section of a second diameter defining a radial surface extending in axial alignment with the first section in a direction opposite to the face, a central passage extending axially within the second section, and one or more flow passages extending between the central passage and the face of the first section, at least one of the flow passages having an aperture in the radial surface of the second section;

a gating needle removably secured to each of the flow passages on the face of the first cylindrical section;

a plug adapted to be received in each aperture in the radial surface of the second cylindrical section; and a flange having a central opening sized so as to be received by the second cylindrical portion of the body and affixed to the body so as to overlie each plug.

9. The injection molding nozzle of claim 8 wherein the flange has a first section having a first outside diameter and a second generally cylindrical section having a second outside diameter, the outside diameter of the second section of the flange being greater than the outside diameter of the first section of the central body.

10. The injection molding nozzle of claim 8 wherein the diameter of the first section of the central body is larger than the diameter of the second portion of the central body so as to define a radial seat on the body for receiving the flange.

11. The injection molding nozzle of claim 10 wherein the flange has a first generally cylindrical section having a first outside diameter corresponding to the outside diameter of the first section of the central body and a second generally cylindrical section having a second outside diameter, the outside diameter of the second section of the flange being greater than the outside diameter of the first section of the central body.

12. The injection molding nozzle of claim 8 wherein at least one of the flow passages comprises a first branch extending radially through the second section of the central body and terminating in the aperture in the radial surface of the second section and a second branch extending from the first branch to the face of the first section of the central body, the second branch removably receiving the nozzle seal.

13. The injection molding nozzle of claim 12 comprising a plurality of flow passages.

14. The injection molding nozzle of claim 8 wherein in the radial surface of the first section of the central body includes a flared portion having an outside diameter greater than the first outside diameter of the first section of the central body, the flared portion adapted to form a seal.

15. The injection molding nozzle of claim 14 wherein the flared portion is adjacent the face of the first section of the central body.

16. The injection molding nozzle of claim 12 wherein at least one plug comprises a cylindrical body with an outside diameter greater than the diameter of the first branch in the central body and having a first length and a radial surface, a central passage extending partially along the length of the cylindrical body in communication with the first branch in the central body, and an aperture in the radial surface of the cylindrical body connecting the central passage to the second branch in the central body.

17. The injection molding nozzle of claim 12 wherein at least one plug comprises a cylindrical body having an outside diameter greater than the diameter of the first branch in the central body and a length corresponding approximately to the difference between the outside diameter of the second section of the central body and distance between the longitudinal axis of the central body and the longitudinal axis of the second branch in the central body.

18. The injection molding nozzle of claim 8 further comprising an alignment pin extending radially from the flange.

* * * * *